Patented June 20, 1939

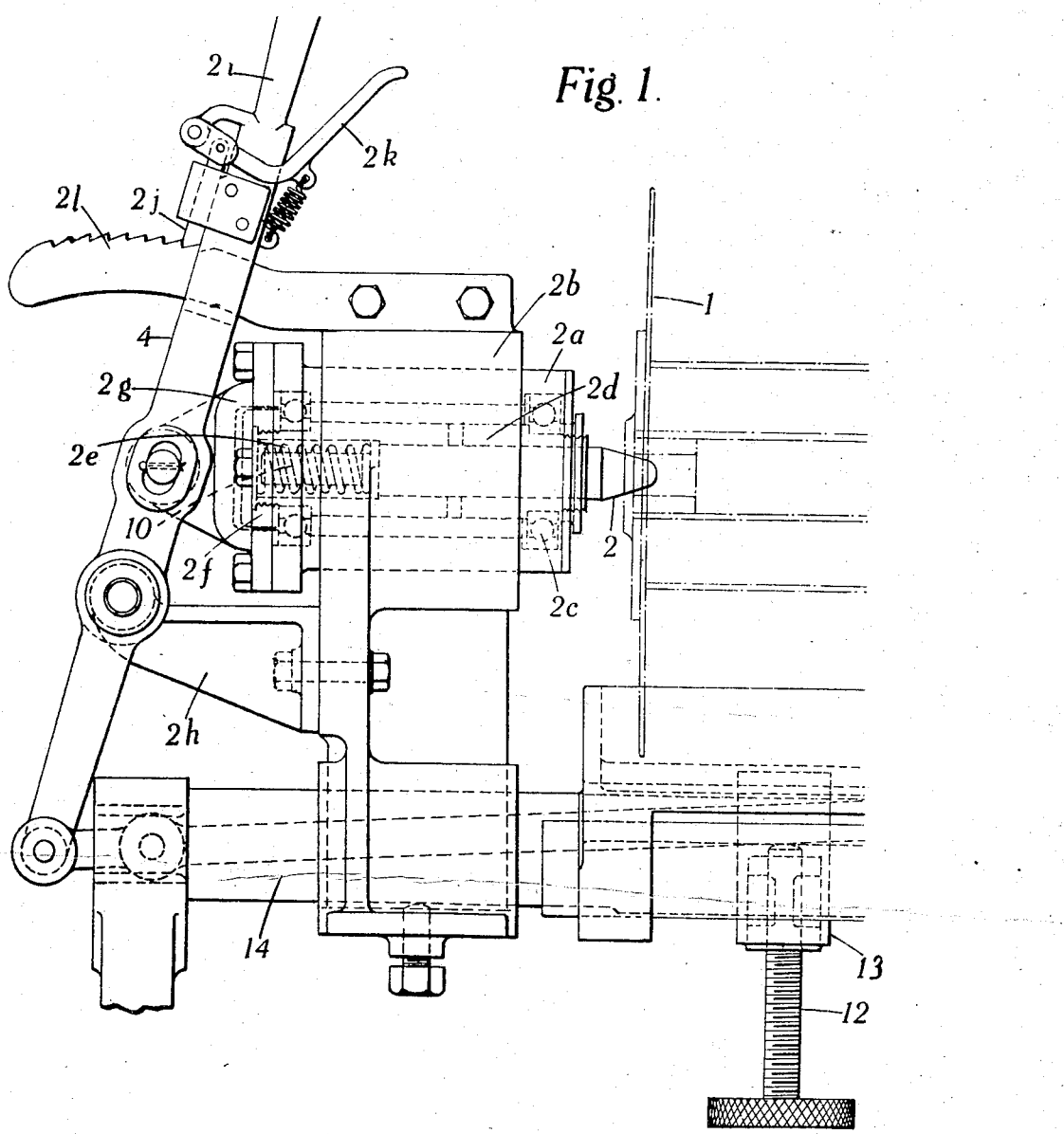

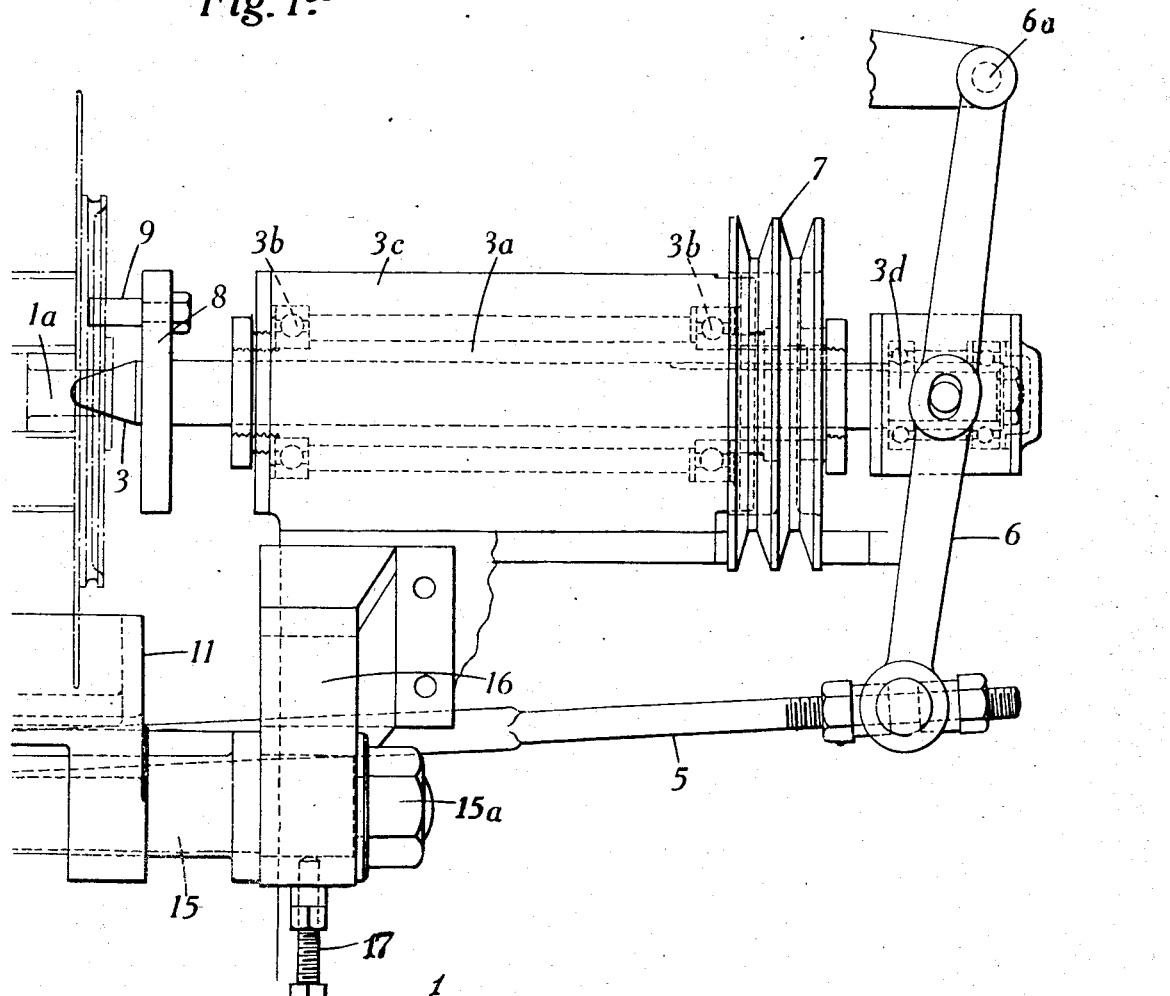
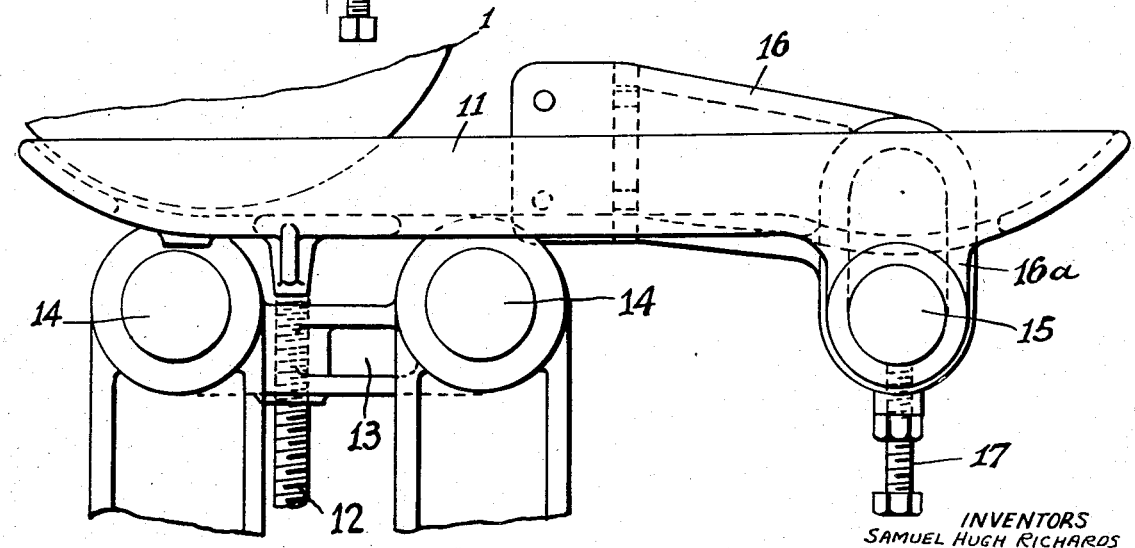

2,163,010

UNITED STATES PATENT OFFICE 2,163,010

MEANS FOR WINDING ON SPOOLS, WIRE, CORD, YARN, AND OTHER MATERIALS

Samuel Hugh Richards, Harpenden, and Waldo John Clements, Prescot, England; said Clements assignor to British Insulated Cables Limited, Prescot, Lancashire, England Application August 20, 1937, Serial No. 160,028 In Great Britain September 5, 1936

4 Claims. (Cl. 242—58)

This invention relates to the convenient and rapid handling of spools in machines adapted to deal with wire, cord, yarn or other material.

In such machines it is necessary from time to time to remove a full spool from the machine and replace it by an empty spool, or alternatively to take away an empty spool and replace it by a full spool.

As previously constructed, such an arrangement has had one of the centres fixed and the other movable axially. In the removal of spools from a machine of this kind by the withdrawal of the movable centre, it has been found that the disengagement of the spool from the fixed centre does not readily take place. The central recess or aperture in that end of the spool hangs on the fixed centre and may require to be levered away therefrom. Similarly when inserting a spool into position in a machine of this kind it may be necessary to assist by the use of a bar, or otherwise, the movement of the spool into correct position on the fixed centre. These difficulties are particularly noticeable with heavily loaded spools.

The present invention obviates the necessity for any direct handling of the spools. It ensures that the rapid and easy removal and insertion of the spools can be effected by a simple operation. This results from providing that both centres are adapted to be moved axially simultaneously in opposite directions. For the removal of a spool both centres are completely withdrawn from the recesses in the ends of the spool, thus permitting the spool to fall gently on to a support placed a short distance below its running position and to be rolled, on the support surface, away from the centres. Similarly when inserting a spool it can be rolled into position and then the two ends of the centres can be inserted in the recess and moved simultaneously so as to lift the spool and complete the mounting of it in the running position.

A convenient embodiment of the invention is illustrated in the accompanying drawings wherein:—

Figures 1 and 1a together constitute front elevation of a spool release gear, and Figure 2 is a side elevation of the lower part of Figure 1.

Referring to these drawings, Figure 1 shows a spool 1 in working position (i. e. held between tapered centres 2 and 3). The centres are axially and simultaneously adjustable by mechanical interconnection comprising a lever 4, and connecting rod 5 and another lever 6, the fulcrums of the levers 4 and 6 being so arranged that the centres are simultaneously moved axially in opposite directions when the lever 4 is actuated.

The end of the machine at which no drive is applied to the spool has a sleeve $2a$ axially slidable in a fixed housing $2b$ carrying within it by means of bearings $2c$ a second sleeve $2d$ within which slides the centre 2 which is in the form of a cylindrical pin with a tapered outer end. This pin is backed by a helical spring $2e$ supported by a cap $2f$ on the end of the inner sleeve $2d$. The outer sleeve $2a$ has a cap or bracket $2g$ connected with the operating lever 4, by operation of which lever it is moved backwards and forwards as required in the housing $2b$.

The centre 3 forms the tapered end of a cylindrical pin which extends through a sleeve $3a$ rotatable in bearings $3b$ in the fixed housing $3c$, the rear end of the centre 3 being connected to a driving pulley 7, and being then extended further to engage a collar $3d$ which is free to turn relative to the centre 3 and is engaged by the operating lever 6. On the centre 3 is provided driving means comprising a driver 8 and a pin 9 adapted to enter a suitable aperture provided therefor in the spool 1.

Associated with the housing $2b$ is a bracket $2h$ carrying on its outer end a fulcrum for the lever 4. This lever 4 extends upward to engage the bracket $2g$ on the outer sleeve $2a$ carrying the centre 2 and then beyond to form a handle $2i$ at the upper end. On this handle $2i$ is mounted a spring pawl $2j$ with a releasing lever $2k$. This pawl $2j$ works in a segmental rack $2l$ mounted at the upper part of the housing $2b$.

The connecting rod 5 engages the lever 4 beneath the fulcrum and passes across below the spool 1 to engage the lower end of the lever 6. This lever 6 is pivoted at its upper end at $6a$ above the point at which it engages the collar $3d$ mounted on the rear end of the centre 3.

The support surface comprises a tray 11 (Figures 1 and 2) which is in turn supported at one end by an adjusting screw 12 adapted to pass through a bridge-piece 13 carried on rods 14. The other (and outer) end of the tray 11 is formed with a dip in the tray runway and is supported by a rod 15 carried in a bracket 16, and has another adjusting screw 17. On a bracket 16 is a guide $16a$ in which the rod 15 is slidable but is clamped in position as desired by a nut $15a$. The tray 11 is so formed as to limit the axial movements of a spool.

The purpose of the helical spring $2e$ is to impart a slight resiliency to the centres 2 and 3 so that they are always held in close connection with the central aperture 1a of the spool 1, and chattering or jerking is obviated. Although not shown, a spring can also be fitted to the centre 3.

In operation, when the handle 2i is grasped, and the spring pawl 2j is released from the rack 2l by actuation of the releasing lever 2k, a continued pull at the handle 2i of the lever 4 causes through the action of the connecting rod 5, a similar movement being imparted to the lever 6, so that a simultaneous axial movement of the two centres 2 and 3 takes place, and the tapered centres 2 and 3 enter partly into the ends of the central aperture 1a of the spools 1. Below the centres 2 and 3 is located the tray 11 so spaced therefrom that when a spool is in the machine and held between the centres 2 and 3, its flanges are clear of the surface of the tray 11, but come into contact therewith when the centres 2 and 3 are withdrawn axially through the action of the levers 4 and 6 and the spool is permitted to gradually fall while still supported by the tapered centres until it encounters and becomes in turn supported by the tray.

In the reverse process of placing a spool 1 in position it is rolled along the tray 11 until it stands between the centres 2 and 3 in such a position that the points of the tapered ends of the centres 2 and 3 can enter the aperture 1a under the action of the levers 4 and 6. By continued operating of the levers 4 and 6 the centres 2 and 3 are moved towards each other and the action of the tapered ends gradually lifts the spool clear of the tray 11 and brings it into the correct position on the axis of rotation. At the same time the pin 9 slides into the aperture provided for it in the spool 1, which has been previously positioned to receive it, so that there is a positive driving action between the spool 1 and the centre 3.

In unwinding wire from a spool, the driver 8 and pin 9 could be dispensed with.

The tray 11, when a spool has been rolled along it until it stands between the centres 2 and 3, is adjusted vertically by means of the adjusting screws 12 and 17 so that the central recess of aperture 1a is on an axial plane slightly below that of the centres 2 and 3, and the tapered ends of 2 and 3 are able gradually either to lift the spool clear of the tray or drop it back thereon. This adjusting means enables the machine to deal with spools of different diameters.

When the working operation has been completed and the spool 1 has been lowered onto the tray 11, it then rolls along this tray away from the centres 2 and 3, and when the spool is in this position at the end of the tray away from the centres it does not interfere with the loading into the machine of another spool.

What we claim as our invention is:—

1. Means for rotatably mounting spools in a machine, comprising two tapered centres arranged in line and adapted to engage central recesses or apertures in the ends of a spool, two levers, one operatively connected with each of said centres, a fixed pivot for each of said levers, a connecting rod joining said levers and an actuating member connected with one of said levers, the whole arranged as means for imparting simultaneous and oppositely directed movements to the said centres.

2. Means for rotatably mounting spools in a machine comprising fixed supports, two tapered centers carried by the said supports and free to move along a common axis with relation to the said supports, means for supporting a spool in a position in which the common axis of the centers passes through central apertures in the ends thereof but above the axis of the spool, and a mechanical coupling between said centers arranged as means for imparting simultaneous and oppositely directed axial movements to said centers whereby the spool is moved from one of two positions to another, the said two positions being one in which the spool is supported solely by the said centers and one in which the spool is supported solely by the said other supporting means therefor.

3. Means for rotatably mounting spools in a machine comprising fixed supports, two tapered centers carried by the said supports and free to move along a common axis with relation to the said supports which take the weight of the spool, a vertically adjustable tray adapted to support a spool so that the said axis of the centers does not coincide with the axis of the spool but passes through central apertures at each end thereof above the axis of the spool, and a mechanical coupling between said centers arranged as means for imparting simultaneous and oppositely directed axial movements to said centers whereby the spool is moved from one of two positions to another, the said two positions being one in which the spool is supported solely by the said centers and one in which the spool is supported by the tray.

4. Means for rotatably mounting spools in a machine comprising fixed supports, two tapered centers carried by the said supports and free to move along a common axis with relation to the said supports which take the weight of the spool, a tray adapted to support a spool so that the said axis of the centers does not coincide with the axis of the spool but passes through central apertures at each end thereof above the axis of the spool, means for adjusting said tray vertically at two points to vary the distance between the tray and the said axis of the centers and to vary the slope of the said tray, and a mechanical coupling between said centers arranged as means for imparting simultaneous and oppositely directed axial movements to said centers, whereby the spool is moved from one of two positions to another, the said two positions being one in which the spool is supported solely by the said centers and one in which the spool is supported by the tray.

WALDO JOHN CLEMENTS.
SAMUEL HUGH RICHARDS.